(12) United States Patent
Eto et al.

(10) Patent No.: US 11,397,122 B2
(45) Date of Patent: Jul. 26, 2022

(54) PRESSURE SENSOR MODULE

(71) Applicant: Robert Bosch GmbH, Stuttgart (DE)

(72) Inventors: Masaya Eto, Kanagawa (JP); Yasuhiro Kawai, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/972,702

(22) PCT Filed: Jun. 3, 2019

(86) PCT No.: PCT/IB2019/054574
§ 371 (c)(1),
(2) Date: Dec. 7, 2020

(87) PCT Pub. No.: WO2019/234583
PCT Pub. Date: Dec. 12, 2019

(65) Prior Publication Data
US 2021/0262885 A1 Aug. 26, 2021

(30) Foreign Application Priority Data
Jun. 6, 2018 (JP) .............................. JP2018-108378

(51) Int. Cl.
*G01L 19/00* (2006.01)
*G01L 19/14* (2006.01)
*G01L 19/06* (2006.01)

(52) U.S. Cl.
CPC ........ *G01L 19/147* (2013.01); *G01L 19/0038* (2013.01); *G01L 19/0084* (2013.01); *G01L 19/0627* (2013.01); *G01L 19/143* (2013.01)

(58) Field of Classification Search
None
See application file for complete search history.

(56) References Cited

U.S. PATENT DOCUMENTS

| 8,874,343 B2 * | 10/2014 | Anderson | B60T 13/745 |
| | | | 701/70 |
| 2011/0016981 A1* | 1/2011 | Gebauer | G01L 19/0084 |
| | | | 73/753 |
| 2011/0016982 A1* | 1/2011 | Henzler | G01L 19/0038 |
| | | | 73/756 |
| 2014/0137656 A1* | 5/2014 | Henzler | G01D 11/30 |
| | | | 73/756 |
| 2017/0343395 A1* | 11/2017 | Woernle | G01D 11/245 |

OTHER PUBLICATIONS

International Search Report and Written Opinion for Application No. PCT/IB2019/054574 dated Sep. 30, 2019 (9 pages).

* cited by examiner

*Primary Examiner* — Lisa M Caputo
*Assistant Examiner* — Nigel H Plumb
(74) *Attorney, Agent, or Firm* — Michael Best & Friedrich LLP

(57) ABSTRACT

A pressure sensor module detects a fluid pressure on the basis of a differential pressure between a reference pressure and the fluid pressure, and includes: a housing; a sensor element that can contact each of the reference pressure and the fluid pressure; a support member that supports the sensor element and is held in the housing; a first pressure passage that guides the fluid pressure to a first contact surface of the sensor element; and a second pressure passage that is sealed from the first pressure passage and guides the reference pressure to a second contact surface of the sensor element.

11 Claims, 4 Drawing Sheets

[FIG. 1]
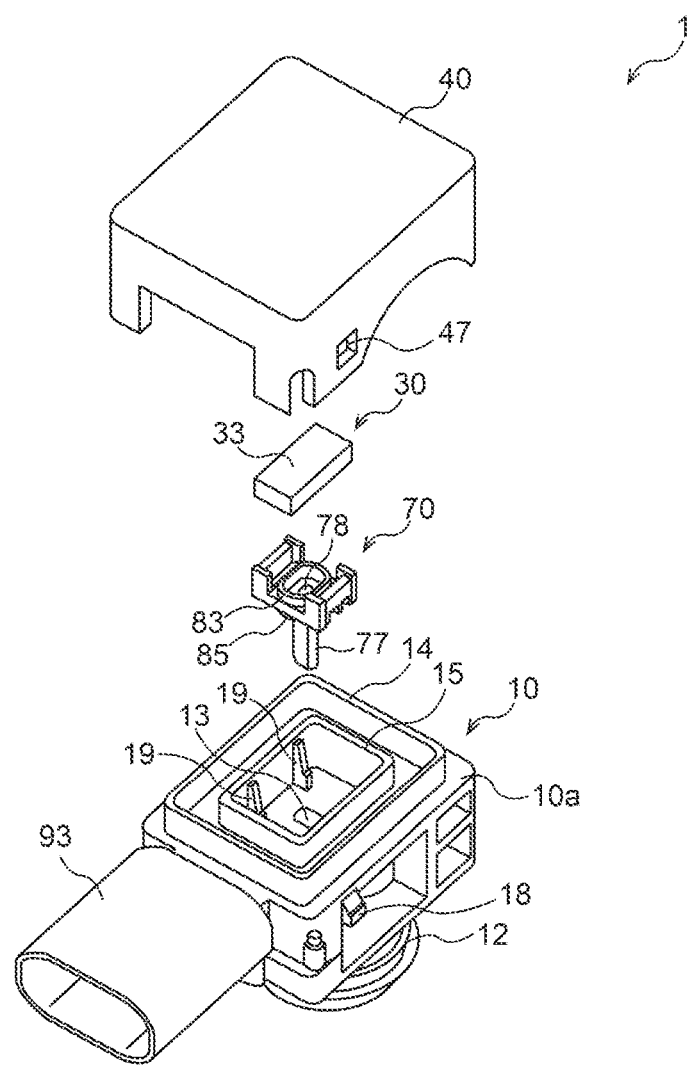

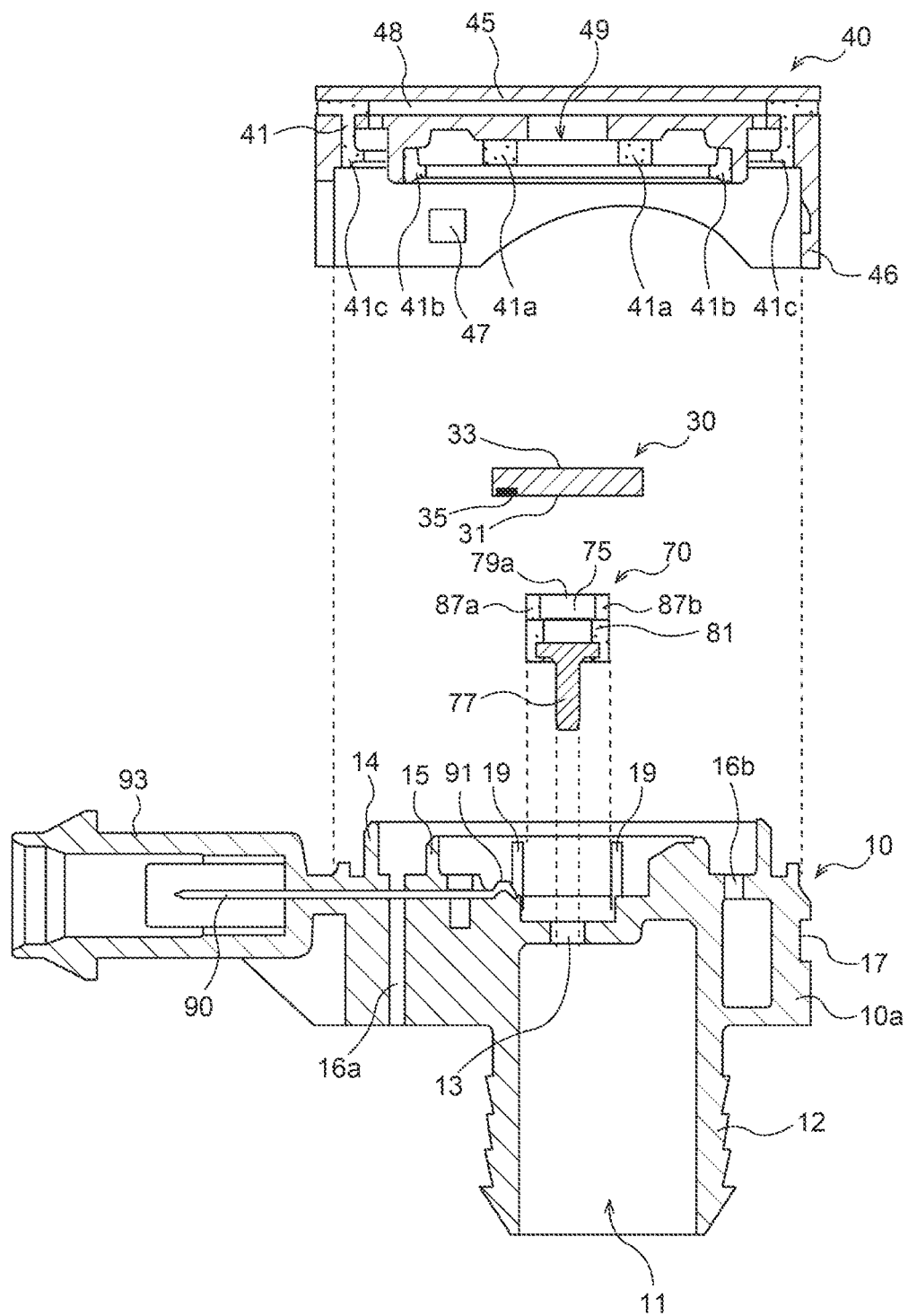
[FIG. 2]

[FIG. 3]
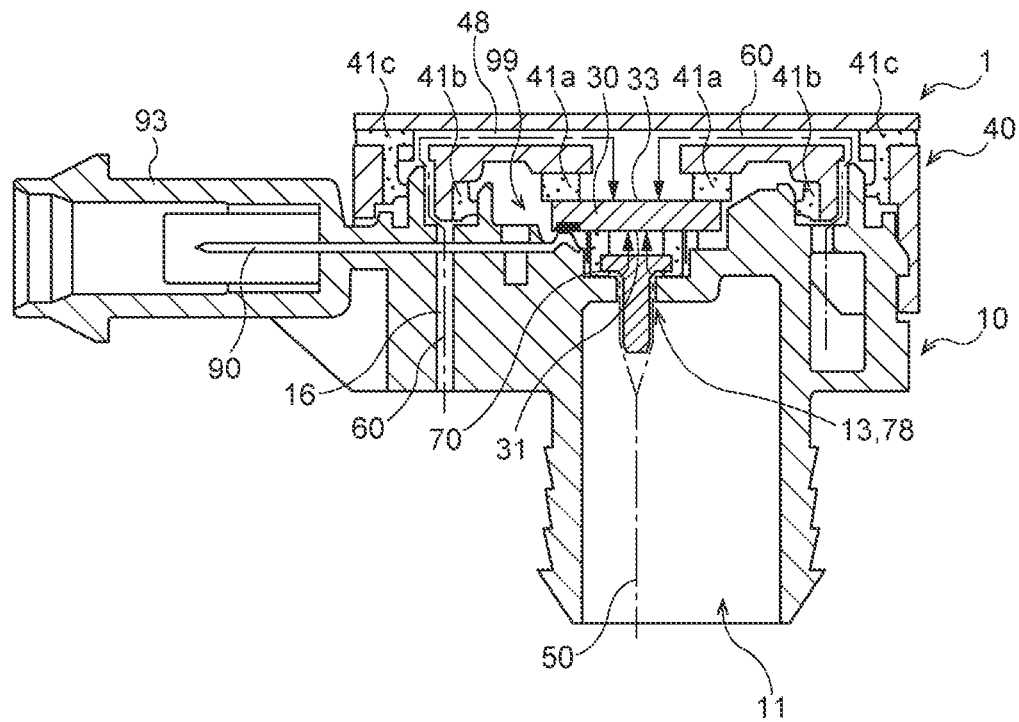
[FIG. 4]
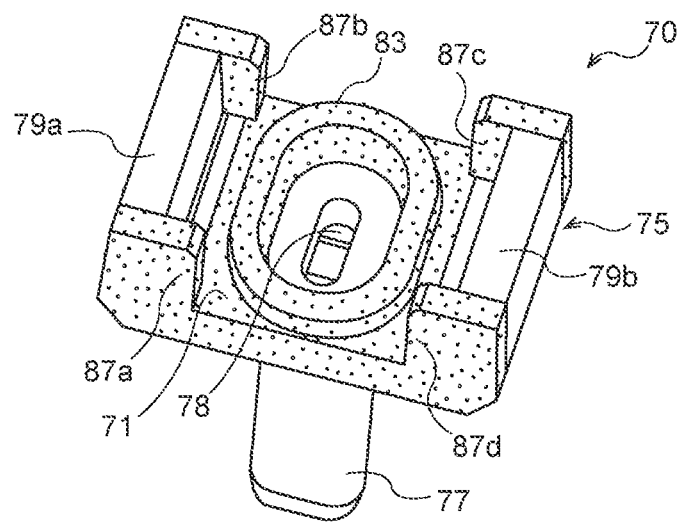

[FIG. 5]
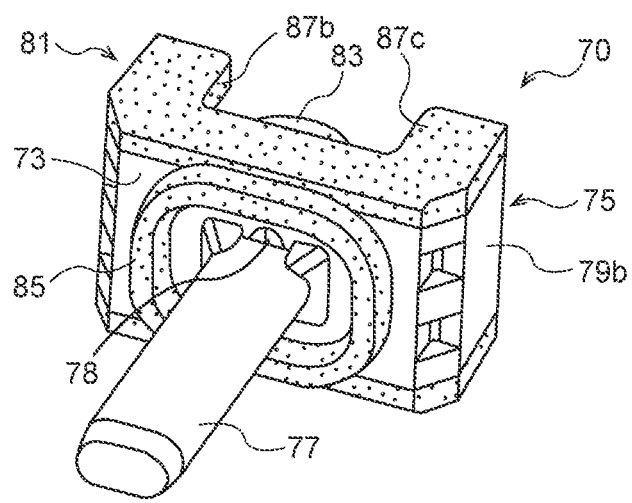

PRESSURE SENSOR MODULE

BACKGROUND OF THE INVENTION

The present invention relates to a pressure sensor module that detects a fluid pressure.

A pressure sensor module of a type that detects a fluid pressure as a relative pressure to a reference fluid pressure has conventionally been known. In such a pressure sensor module, a sensor element and a housing are hermetically sealed using an adhesive or an elastic rubber seal.

For example, in US 2011/0016981, a pressure sensor module for which the adhesive is adopted as a seal material is disclosed. In US 2011/0016982, a pressure sensor module for which a single elastic seal member is adopted as the seal material is disclosed.

However, in regard to the pressure sensor modules disclosed in US 2011/0016981 and US 2011/0016982, efficient assembly work of the pressure sensor module itself may not be always performed. For example, in order to manufacture the pressure sensor module disclosed in US 2011/0016981, a device that applies the adhesive is required, and a process of hardening the applied adhesive is also required.

In addition, a length or a width of the pressure sensor module itself is approximately 10 mm or less, for example. Accordingly, in regard to the pressure sensor module disclosed in US 2011/0016982, the elastic seal member that is arranged at a specified position is extremely small and thus is difficult to be handled in the assembly work.

Furthermore, the pressure sensor module disclosed in each of US 2011/0016981 and US 2011/0016982 is assembled by placing the sensor element on a specified surface of the housing. Thus, during manufacturing, the sensor element is possibly jumped out of or is possibly reversed in the specified position.

SUMMARY OF THE INVENTION

The present invention provides a pressure sensor module capable of improving work efficiency during assembly.

Solution to Problem

In order to solve the above problem, according to an aspect of the present invention, a pressure sensor module that detects a fluid pressure on the basis of a differential pressure between a reference pressure and the fluid pressure is provided. The pressure sensor module includes: a housing; a sensor element that can contact each of the reference pressure and the fluid pressure; a support member that supports the sensor element and is held in the housing; a first pressure passage that guides the fluid pressure to a first contact surface of the sensor element; and a second pressure passage that is sealed from the first pressure passage and guides the reference pressure to a second contact surface of the sensor element. The support member is a structure that is formed by integrating an elastic material section exerting sealing performance on the first pressure passage and the second pressure passage and capable of being elastically deformed and a hard material section, rigidity of which is higher than the elastic material section.

As it has been described so far, according to the present invention, it is possible to improve work efficiency during assembly of the pressure sensor module.

BRIEF DESCRIPTION OF DRAWINGS

FIG. 1 is an exploded perspective view of a pressure sensor module according to an embodiment of the present invention.

FIG. 2 is an exploded cross-sectional view of the pressure sensor module according to the embodiment.

FIG. 3 is a cross-sectional view of the pressure sensor module according to the embodiment.

FIG. 4 is a perspective view of a support member for the pressure sensor module according to the embodiment that is seen from above.

FIG. 5 is a perspective view of the support member for the pressure sensor module according to the embodiment that is seen from below.

DETAILED DESCRIPTION

A detailed description will hereinafter be made on a preferred embodiment of the present invention with reference to the accompanying drawings. In the specification and the drawings, components that have substantially the same functional configurations will be denoted by the same reference signs, and a description thereon will not be repeated.

In the following description, a cover 40 side will be described as an upper side, an inlet port 12 side will be described as a lower side for convenience.

A description will be made on a configuration example of a pressure sensor module 1 according to this embodiment with reference to FIG. 1 to FIG. 5. FIG. 1 is an exploded perspective view of the pressure sensor module 1. FIG. 2 is an exploded cross-sectional view of the pressure sensor module 1, and FIG. 3 is a cross-sectional view of the pressure sensor module 1. FIG. 4 is a perspective view of a support member 70 that is seen from above. FIG. 5 is a perspective view of the support member 70 that is seen from below. In FIG. 2 to FIG. 5, an elastic material section 41 of the cover 40 and an elastic material section 81 of the support member 70 are dotted.

The pressure sensor module 1 includes a housing 10, the support member 70, a sensor element 30, and the cover 40.

<Housing>

The housing 10 is constructed of a molded article that is made of a resin material, for example, and has a body 10a in a substantially rectangular-parallelepiped shape. The housing 10 has the inlet port 12 that is projected from a bottom surface of the body 10a. The inlet port 12 has a substantially hollow cylindrical shape, and has an internal space that serves as an inflow passage 11.

The inlet port 12 is inserted in a container, which is not illustrated and is a target in which a fluid pressure is measured. The inlet port 12 and the container are hermetically sealed by a grommet seal or the like, which is not illustrated, for example.

The housing 10 has a first partition wall 14 and a second partition wall 15 that are vertically provided on a top surface of the body 10a. Along an outer edge of the top surface of the housing 10, the first partition wall 14 is vertically provided in a substantially rectangular shape when seen in a plan view. In the inside of the first partition wall 14, the second partition wall 15 is vertically provided in a substantially rectangular shape when seen in the plan view with a space being interposed between the first partition wall 14 and the second partition wall 15.

In an inside space surrounded by the second partition wall 15, the sensor element 30 that is supported by the support member 70 is arranged. In a substantially central portion of the inside space of the second partition wall 15, a communication passage 13 is provided to communicate with the inflow passage 11, which is the internal space of the inlet port 12. Plural ribs 19, each of which fixes a position of the support member 70, are provided on parts of an inner circumferential surface of the second partition wall 15.

The housing 10 includes a connector 93 that is projected from one lateral surface of the body 10a. The connector 93 has a hollow cylindrical shape. In the housing 10, an electrically-conductive bus bar 90 that is made of metal, for example, is embedded. One end of the bus bar 90 is exposed to an internal space of the connector 93. The other end of the bus bar 90 as a connection terminal 91 is exposed to the inside space of the second partition wall 15.

The housing 10 includes a concave section 17 and a convex section 18 on lateral surfaces of the body 10a. Each of the concave section 17 and the convex section 18 serves as an engagement section at the time when the cover 40 is attached. In addition to those illustrated in the drawings, the appropriate number of the concave section 17 and/or the convex section 18 may be provided.

The body 10a of the housing 10 has internal passages 16a, 16b, one end of each of which is opened to the top surface of the body 10a and the other end of each of which is opened to the bottom surface or the lateral surface of the body 10a. The internal passages 16a, 16b constitute parts of a second pressure passage 60.

<Cover>

The cover 40 is a structure that is formed by integrating the elastic material section 41 exhibiting sealing performance and a hard material section 45, rigidity of which is higher than the elastic material section 41. The cover 40 has a substantially rectangular-parallelepiped shape, a lower side of which is opened. The cover 40 is attached to the housing 10 in a manner to cover the sensor element 30 and the support member 70.

The elastic material section 41 is a constituent part that is made from a material produced by containing one type or plural types of thermoplastic elastomers or liquid silicon rubber, for example. The elastic material section 41 has appropriate elasticity in accordance with the desired sealing performance. The hard material section 45 is a constituent part that is made from a resin material such as of ABS, polycarbonate, polybutylene terephthalate, polypropylene, or polyamide. The hard material section 45 has the higher rigidity than the elastic material section 41.

The hard material section 45 constitutes a base portion of the cover 40. The hard material section 45 includes a flow hole 48 that constitutes a part of the second pressure passage 60. The hard material section 45 also includes a locking section 46 and an opening 47 on lateral surfaces. Each of the locking section 46 and the opening 47 serves as the engagement section at the time when the cover 40 is attached to the housing 10. In addition to those illustrated in the drawings, the appropriate number of the locking section 46 and the opening 47 may be provided.

The elastic material section 41 is formed by being incorporated into the hard material section 45 as the base portion. A part of the elastic material section 41 is arranged in a part of the flow hole 48 formed in the hard material section 45, and seals the flow hole 48 that leads to a lateral surface of the cover 40.

The elastic material section 41 has a first cover seal section 41a, a second cover seal section 41b, and a third cover seal section 41c, each of which has a substantially rectangular shape when seen in the plan view. The first cover seal section 41a is arranged in the inside, the third cover seal section 41c is arranged on the outside, and the second cover seal section 41b is arranged between the first cover seal section 41a and the third cover seal section 41c.

A lower end of the first cover seal section 41a elastically contacts a second contact surface 33 of the sensor element 30. An inside space of the first cover seal section 41a constitutes a part of the second pressure passage 60. The first cover seal section 41a has a function of sealing the second pressure passage 60 in the inside of the first cover seal section 41a and a space on an outer circumferential side of the first cover seal section 41a in a state of elastically contacting the second contact surface 33 of the sensor element 30.

When the first cover seal section 41a comes in elastic contact with the sensor element 30, an electrical connection section 35 of the sensor element 30 is pressed against the connection terminal 91 of the bus bar 90. In this way, reliability of electrical connection between the sensor element 30 and the bus bar 90 is improved.

An inner circumference of the second cover seal section 41b elastically contacts an outer circumferential surface of the second partition wall 15 in the housing 10. The second cover seal section 41b has a function of sealing the inside space of the second partition wall 15, which is formed on the top surface of the housing 10, and the second pressure passage 60, which is formed on an outer circumferential side of the second partition wall 15.

An inner circumference of the third cover seal section 41c elastically contacts an outer circumferential surface of the first partition wall 14 in the housing 10. The third cover seal section 41c has a function of sealing the second pressure passage 60, which is formed in an inside space of the third cover seal section 41c, from an external space of the cover 40.

A space that is defined by abutment of the first cover seal section 41a against the second contact surface 33 of the sensor element 30 and abutment of the second cover seal section 41a against the outer circumferential surface of the second partition wall 15 functions as an electrical connection space 99 in which the connection terminal 91 of the bus bar 90, the sensor element 30, and the like are arranged (see FIG. 3).

<Support Member>

The support member 70 is a structure that is formed by integrating the elastic material section 81 exerting sealing performance and a hard material section 75, rigidity of which is higher than the elastic material section 81. The support member 70 is arranged in the inside space of the second partition wall 15 in the housing 10 and is positioned by the plural ribs 19, which are formed on the inner circumferential surface of the second partition wall 15.

The support member 70 includes a first seal section 83, a second seal section 85, a guide section 77, partition wall sections 79a, 79b, and sensor support ribs 87a to 87d. Of the components described herein, the first seal section 83, the second seal section 85, and the sensor support ribs 87a to 87d constitute parts of the elastic material section 81. The guide section 77 and the partition wall sections 79a, 79b constitute parts of the hard material section 75.

The elastic material section 81 is a constituent part that is made from a material produced by containing one type or plural types of the thermoplastic elastomers or the liquid silicon rubber, for example. The elastic material section 81 has appropriate elasticity in accordance with the desired sealing performance. The hard material section 75 is a constituent part that is made from a resin material such as of ABS, polycarbonate, polybutylene terephthalate, polypropylene, or polyamide. The hard material section 75 has the higher rigidity than the elastic material section 81.

The first seal section 83 has a substantially elongated ring shape when seen in the plan view, and is provided in a substantially central portion of a first surface 71 that corresponds to a top surface of the support member 70. The second seal section 85 has a substantially elongated ring shape when seen in the plan view, and is provided in a substantially central portion of a second surface 73 that corresponds to a bottom surface of the support member 70. A part of the hard material section 75 is arranged in an inside space that is surrounded by the first seal section 83 and the second seal section 85.

The guide section 77, which is the part of the hard material section 75, is projected downward from the inside space of the second seal section 85. The guide section 77 is inserted in the communication passage 13 of the housing 10. A clearance is provided between the guide section 77 and an inner circumferential surface of the communication passage 13, and the fluid pressure can flow through the clearance.

In a central portion of the hard material section 75 that is located in the inside space surrounded by the first seal section 83 and the second seal section 85, a through-hole 78 is provided to communicate between the first surface 71 and the second surface 73. The through-hole 78 is provided adjacent to an upper end of the guide section 77. The through-hole 78 constitutes apart of a first pressure passage 50 that guides the fluid pressure to a first contact surface 31 of the sensor element 30.

The partition wall sections 79a, 79b are provided upward from both ends in one direction of the first surface 71 of the support member 70. The sensor support ribs 87a, 87b are arranged at both ends of the partition wall section 79a. Each of the sensor support ribs 87a, 87b is bulged to a central side in the one direction from the partition wall section 79a.

The sensor support ribs 87c, 87d are arranged at both ends of the partition wall section 79b. Each of the sensor support ribs 87c, 87d is bulged to the central side in the one direction from the partition wall section 79b. The sensor element 30 is elastically supported by the four sensor support ribs 87a to 87d.

An upper end of the first seal section 83 elastically contacts the first contact surface 31 of the sensor element 30. The inside space of the first seal section 83 constitutes a part of the first pressure passage 50. The first seal section 83 has a function of sealing the first pressure passage 50 in the inside of the first seal section 83 and the electrical connection space 99 on the outside of the first seal section 83 in a state of elastically contacting the sensor element 30.

A lower end of the second seal section 85 elastically contacts a surface around the communication passage 13 of the housing 10. The second seal section 85 has a function of sealing the first pressure passage 50 in the inside of the second seal section 85 and the electrical connection space 99 on the outside of the second seal section 85.

<Sensor Element>

The sensor element 30 is elastically supported by the support member 70, which is held in the housing 10. The electrical connection section 35 of the sensor element 30 contacts and is electrically connected to the connection terminal 91 of the bus bar 90 provided in the housing 10.

The fluid pressure that is delivered via the first pressure passage 50 (see FIG. 3) comes in contact with the first contact surface 31 as a bottom surface of the sensor element 30. The first pressure passage 50 is configured to include: the inflow passage 11 that is the internal space of the inlet port 12 in the housing 10; the communication passage 13 of the housing 10; and the through-hole 78 of the support member 70. The first pressure passage 50 is sealed from the electrical connection space 99 by the first seal section 83 and the second seal section 85 of the support member 70.

A reference pressure that is delivered via the second pressure passage 60 (see FIG. 3) comes in contact with the second contact surface 33 as a top surface of the sensor element 30. The second pressure passage 60 is configured to include: the internal passages 16a, 16b that are formed in the housing 10; and the flow hole 48 that is formed in the cover 40. The second pressure passage 60 is sealed from the electrical connection space 99 by the first cover seal section 41a and the second cover seal section 41b of the cover 40. The third cover seal section 41c prevents direct entry of water droplets and dust into the second pressure passage 60.

As described above, the first pressure passage 50 and the second pressure passage 60 are sealed from each other by the first seal section 83 and the second seal section 85. The sensor element 30 outputs a detection signal on the basis of a difference between the fluid pressure applied to the first contact surface 31 and the reference pressure applied to the second contact surface 33. For example, the second pressure passage 60 is exposed to the atmosphere, and the reference pressure in this case is the atmospheric pressure.

<Assembling Method>

The pressure sensor module 1 according to this embodiment is assembled as follows.

(Assembly of Support Member)

The support member 70 is arranged on the housing 10. At the time, the guide section 77 of the support member 70 is first inserted in the communication passage 13 of the housing 10. While the guide section 77 is guided by the communication passage 13, the support member 70 is pressed thereinto. The support member 70 is positioned by the plural ribs 19, which are formed on the inner circumferential surface of the second partition wall 15 in the housing 10. In this way, the support member 70 can easily be arranged at a specified position.

(Assembly of Sensor Element)

The sensor element 30 is arranged on the support member 70. The sensor element 30 is elastically supported by the four sensor support ribs 87a to 87d of the support member 70. The first contact surface 31 of the sensor element 30 contacts the upper end of the first seal section 83 in the support member 70.

(Assembly of Cover)

The cover 40 is attached to the top surface side of the housing 10. At the time, the locking section 46 and the opening 47 of the cover 40 are respectively engaged with the concave section 17 and the convex section 18 of the housing 10, and the cover 40 is thereby fixed to the housing 10.

In a state where the cover 40 is assembled, the first cover seal section 41a of the cover 40 elastically contacts the second contact surface 33 of the sensor element 30. In addition, the second cover seal section 41b of the cover 40 elastically contacts the outer circumferential surface of the second partition wall 15 in the housing 10. In this way, the electrical connection space 99 and the second pressure passage 60 are hermetically sealed.

Furthermore, the third cover seal section 41c of the cover 40 elastically contacts the outer circumferential surface of the first partition wall 14 in the housing 10. In this way, it is possible to reduce the possible direct entry of the water droplets and the dust into the second pressure passage 60.

Due to an elastic force of the first cover seal section 41a, the electrical connection section 35 of the sensor element 30 is pressed against the connection terminal 91 of the bus bar 90. In this way, the electrical connection between the sensor element 30 and the bus bar 90 is easily established.

Moreover, the first seal section 83 of the support member 70 elastically contacts the first contact surface 31 of the sensor element 30, and the second seal section 85 of the support member 70 elastically contacts the surface around the communication passage 13 of the top surface of the housing 10. In this way, the electrical connection space 99 and the first pressure passage 50 are hermetically sealed.

As described above, assembly work of the pressure sensor module 1 according to this embodiment can efficiently be performed while the sealing performance of the first pressure passage 50 and the second pressure passage 60 and the electrical connection between the sensor element 30 and the bus bar 90 are guaranteed.

The assembly work of the pressure sensor module 1 according to this embodiment can be performed by supporting the sensor element 30 using the support member 70, in which the elastic material section 81 exerting the sealing performance and the hard material section 75 having the higher rigidity than the elastic material section 81 are integrated. In this way, it is possible to reduce a possibility that the sensor element 30 is jumped out or reversed.

The preferred embodiment of the present invention has been described in detail so far with reference to the accompanying drawings. However, the present invention is not limited to such an embodiment. It is obvious that a person who has basic knowledge in the technical field to which the present invention pertains could have easily arrived at various modification examples and application examples that fall within the scope of the technical idea described in the claims. It is understood that those naturally fall within the technical scope of the present invention.

For example, in the above embodiment, it is configured that the guide section 77 of the support member 70 is inserted in the communication passage 13 of the housing 10. However, the present invention is not limited to such an embodiment. The guide section 77 of the support member 70 may be inserted in a hole or a concave section that is additionally formed in the housing 10. In addition, in the above embodiment, the guide section 77 of the support member 70 constitutes the part of the hard material section 75. However, the guide section 77 may be a part of the elastic material section 81.

REFERENCE SIGNS LIST

1: Pressure sensor module
10: Housing
11: Inflow passage
13: Communication passage
30: Sensor element
31: First contact surface
33: Second contact surface
40: Cover
41: Elastic material section
41a: First cover seal section
41b: Second cover seal section
41c: Third cover seal section
45: Hard material section
48: Flow hole
50: First pressure passage
60: Second pressure passage
70: Support member
75: Hard material section
77: Guide section
78: Through-hole
81: Elastic material section
83: First seal section
85: Second seal section

The invention claimed is:

1. A pressure sensor module (1) that detects a fluid pressure on the basis of a differential pressure between a reference pressure and the fluid pressure, the pressure sensor module (1) comprising:
a housing (10);
a sensor element (30) configured to contact each of the reference pressure and the fluid pressure;
a support member (70) that supports the sensor element (30) and is held in the housing (10);
a first pressure passage (50) that guides the fluid pressure to a first contact surface (31) of the sensor element (30); and
a second pressure passage (60) that is sealed from the first pressure passage (50) and guides the reference pressure to a second contact surface (33) of the sensor element (30), wherein
the support member (70) is a structure that is formed by integrating an elastic material section (81) and a hard material section (75), the elastic material section (81) exerting sealing performance on the first pressure passage (50) and the second pressure passage (60) and being configured to be elastically deformed, and the hard material section (75) having a rigidity higher than a rigidity of the elastic material section (81).

2. The pressure sensor module (1) according to claim 1, wherein the elastic material section (81) of the support member (70) includes seal sections (83, 85) that are formed on a first surface (71) for supporting the sensor element (30) and on a second surface (73) located on a back surface of the first surface (71).

3. The pressure sensor module (1) according to claim 2, wherein
the support member (70) includes a through-hole (78) that communicates between the first surface (71) and the second surface (73), and
the seal sections (83, 85) are each formed in a ring shape that surrounds a portion around an opening of the through-hole (78).

4. The pressure sensor module (1) according to claim 3, wherein
the housing (10) includes: an inflow passage (11) that constitutes a part of the first pressure passage (50); and a communication passage (13) that communicates the inflow passage (11) with a space side in which the sensor element (30) is arranged, and
on a second surface (73) side, the support member (70) includes a guide section (77) that is inserted in the communication passage (13), a hole, or a concave section, the hole or the concave section being provided in the housing (10).

5. The pressure sensor module (1) according to claim 4 further comprising:
an electrical connection space (99) in which a connection terminal (91) of a bus bar (90) attached to the housing (10) is arranged, an electrical connection section (35) of the sensor element (30) contacting the connection terminal (91), wherein
the seal sections (83, 85) seal the first pressure passage (50) and the electrical connection space (99), so as to seal the first pressure passage (50) and the second pressure passage (60).

6. The pressure sensor module (1) according to claim 5 further comprising:
a cover (40) that is attached to the housing (10), wherein the cover (40) includes a flow hole (48) that constitutes a part of the second pressure passage (60), and
the cover (40) is a structure that is formed by integrating a cover elastic material section (41) and a cover hard material section (45), the cover elastic material section (41) exerting sealing performance on the electrical connection space (99) and the second pressure passage (60) and being configured to be elastically deformed and the cover hard material section (45) having a rigidity higher than a rigidity of the cover elastic material section (41).

7. The pressure sensor module (1) according to claim 6, wherein
the support member (70) includes partition wall sections (79a, 79b) on the first surface (71), and
the partition wall sections (79a, 79b) are integrally formed with ribs (87a to 87d) that position or hold the sensor element (30).

8. The pressure sensor module (1) according to claim 2, wherein
the housing (10) includes: an inflow passage (11) that constitutes a part of the first pressure passage (50); and a communication passage (13) that communicates the inflow passage (11) with a space side in which the sensor element (30) is arranged, and
on a second surface (73) side, the support member (70) includes a guide section (77) that is inserted in the communication passage (13), a hole, or a concave section, the hole or the concave section being provided in the housing (10).

9. The pressure sensor module (1) according to claim 2 further comprising:
an electrical connection space (99) in which a connection terminal (91) of a bus bar (90) attached to the housing (10) is arranged, an electrical connection section (35) of the sensor element (30) contacting the connection terminal (91), wherein
the seal sections (83, 85) seal the first pressure passage (50) and the electrical connection space (99), so as to seal the first pressure passage (50) and the second pressure passage (60).

10. The pressure sensor module (1) according to claim 2 further comprising:
a cover (40) that is attached to the housing (10), wherein
the cover (40) includes a flow hole (48) that constitutes a part of the second pressure passage (60), and
the cover (40) is a structure that is formed by integrating a cover elastic material section (41) and a cover hard material section (45), the cover elastic material section (41) exerting sealing performance on the electrical connection space (99) and the second pressure passage (60) and being configured to be elastically deformed and the cover hard material section (45) having a rigidity higher than a rigidity of the cover elastic material section (41).

11. The pressure sensor module (1) according to claim 1, wherein
the support member (70) includes partition wall sections (79a, 79b) on the first surface (71), and
the partition wall sections (79a, 79b) are integrally formed with ribs (87a to 87d) that position or hold the sensor element (30).

* * * * *